United States Patent [19]

Stoner

[11] Patent Number: 4,596,022
[45] Date of Patent: Jun. 17, 1986

[54] FSK DATA COMMUNICATION SYSTEM
[75] Inventor: Donald L. Stoner, King County, Wash.
[73] Assignee: The Microperipheral Corporation, Redmond, Wash.
[21] Appl. No.: 526,335
[22] Filed: Aug. 25, 1983
[51] Int. Cl.[4] .............................................. H04L 27/10
[52] U.S. Cl. .................................. 375/45; 340/825.58; 329/110; 375/62; 375/88
[58] Field of Search ........................ 375/44, 45, 47, 48, 375/49, 62, 64, 65, 66, 88, 89, 90, 91; 455/615; 332/16 R; 329/110; 340/825.58

[56] References Cited
U.S. PATENT DOCUMENTS

| | | | |
|---|---|---|---|
| 3,271,588 | 9/1966 | Minc ................................... | 375/66 |
| 3,305,634 | 2/1967 | Rusick ................................. | 375/48 |
| 3,417,332 | 12/1968 | Webb .................................. | 375/65 |
| 3,437,932 | 4/1969 | Malakoff ............................. | 375/88 |
| 3,454,718 | 7/1969 | Perreault ............................. | 375/64 |
| 3,474,341 | 10/1969 | Crafts et al. ........................ | 375/91 |
| 3,719,779 | 3/1973 | Wilson ................................ | 375/88 |
| 3,925,614 | 12/1975 | Bousmar ............................. | 375/88 |
| 3,980,824 | 9/1976 | Lamb et al. ........................ | 375/50 |
| 4,500,751 | 2/1985 | Darland et al. .................... | 179/2 DP |

Primary Examiner—Benedict V. Safourek
Assistant Examiner—Stephen Chin
Attorney, Agent, or Firm—Seed and Berry

[57] ABSTRACT

A system for communicating digital data over a limited bandwidth transmission link, including a transition detector for detecting transitions in the binary logic state of an input digital signal and generating a transition indicator signal in response thereto; a frequency-shift key responsive to the transition indicator signal for generating a frequency-shift keyed signal to be transmitted over the link corresponding to the logic states of the input digital signal, the frequency-shift keyed signal comprised of substantially one cycle of a high-frequency signal for a bit at one logic state and substantially one-half cycle of a low-frequency signal for a bit at the other logic state; a zero-crossing detector for detecting zero-crossings of the frequency-shift keyed signal received over the link and generating a zero-crossing indicator signal; a frequency detector responsive to the zero-crossing signal for detecting the high-frequency and low-frequency signals of the frequency-shift keyed signal, and generating a frequency indicator signal; and a pulse generator responsive to the zero-crossing indicator signal and the frequency indicator signal for generating an output digital signal corresponding to the input digital signal. A synchronizer synchronizes shifts between the high-frequency and low-frequency signals of the frequency-shift keyed signal with changes in the logic state of the digital signal. The frequency-shift key includes an oscillator for generating the high-frequency and low-frequency signals, and an oscillator reset for providing substantially in-phase signal shifts between the high-frequency and low-frequency signals of the frequency-shift keyed signal.

8 Claims, 5 Drawing Figures

FSK DATA COMMUNICATION SYSTEM

DESCRIPTION

1. Technical Field

The present invention relates generally to a system for transferring digital data, and more particularly, to a system for transmission of digital data over telephone lines, FM and AM radio and cable broadcasts, and other bandwidth limited links at increased data transmission rates and to a system for increasing transmission rates without requiring additional bandwidth.

2. Background Art

Communications systems for transferring digital data between two points over telephone lines, and FM and AM radio and cable broadcasts are being used with increased frequency, most commonly to allow one computer to access another computer. For example, there has been a great demand and growing use of radio broadcasts for the transmission of computer programs to personal computer owners. Although the cost of such systems has markedly decreased, the cost is nevertheless substantial enough to prevent widespread use of such systems, particularly by the average personal computer owner for home use.

Another problem with conventional data communication systems stems from the bandwidth and other limitations imposed on the signals to be transmitted over the telephone lines and radio broadcasts. Telephone companies, for example, generally require that signals transmitted over the telephone lines be within a certain bandwidth and amplitude so that they do not interfere with signals on other lines. These limitations have, in effect, limited the data transmission rates which one can use to transmit data or required the use of expensive equipment capable of transmitting data at high speed through limited bandwidth.

The most common and lowest cost data communication technique is frequency-shift keying (FSK), by which each of two binary data states are represented by a sine wave of a respective frequency. A typical FSK transmitting modem transmits data at 1200 band in order to operate within the approximately 3 kilo-Hertz audio bandwidth (about 300–3,000 Hertz) limitation imposed by the telephone companies. The modem uses an audio oscillator to generate a 1,200 Hz. signal to represent a logic "one", and a 2,200 Hz. signal to represent a logic "zero". In the past, to achieve successful transmission of data, it has been necessary to transmit these signals for a period of at least one complete cycle of the lowest frequency to enable a frequency detector in the receiving modem to determine whether the signal being transmitted is the lower or higher frequency signal corresponding to logic level one or zero, respectively. Consequently, the rate of data transmission for the modem expressed in baud is the same as the frequency of the lower frequency signal expressed in Hertz.

It will, therefore, be appreciated that there has been a significant need for a data communication system using a frequency shift keying technique which can increase the rate of data transmission while still operating within the limited bandwidth available such a system would be useful to increase the rate of data transmission over a given bandwidth even where bandwidth limitations are not a problem. Preferably, the data communication system should be reliable and inexpensive so that it is commercial feasible for home use with personal computers. The present invention fulfills this need, and further provides other related advantages.

DISCLOSURE OF INVENTION

The present invention resides in a system for communicating digital data over a transmission link, using a modulator means for receiving an input digital signal and generating a corresponding frequency shift keyed signal comprised of high-frequency and low-frequency signals with in-phase signal transitions at frequency shifts, and demodulator means for receiving the frequency-shift keyed signal communicated over the limited bandwidth transmission link and demodulating the received frequency shift signal to generate an output digital signal corresponding to the input digital signal.

The modulator means has transition detector means for detecting transitions in the binary logic state of the input digital signal and generating a transition indicator signal in response thereto, and frequency-shift keying means responsive to the transition indicator signal for generating a frequency-shift keyed signal corresponding to the logic states of the input digital signal. The frequency-shift keyed signal is comprised of essentially one cycle of a high-frequency signal for a bit at one logic state and substantially one-half cycle of a low-frequency signal for a bit at the other logic state. The modulator further includes means for syncronizing shifts between the high-frequency and low-frequency signals with changes in the logic state of the input digital signal, and means for providing essentially in-phase signal shifts between the high-frequency and low-frequency signals.

The demodulator means includes zero-crossing detector means for detecting zero crossings of the received frequency-shift keyed signal and generating a zero-crossing indicator signal, frequency detector means responsive to the zero-crossing signal for detecting the high-frequency and low-frequency signals of the frequency-shift keyed signal and generating a frequency indicator signal, and pulse generator means responsive to the zero-crossing indicator signal and the frequency indicator signal for generating an output digital signal corresponding to the input digital signal.

More specifically, in the presently preferred embodiment of the invention, the modulator means has a first differentiator for differentiating high-to-low transitions of the digital signal and generating a first transition signal; a second differentiator for differentiating low-to-high transitions of the input digital signal and generating a second transition signal; and an oscillator for generating a high-frequency signal and a low-frequency signal, with the oscillator being reset in response to each of the first and second transition signals, and switched between the high-frequency and low-frequency signals in response to transitions from one state to another state of the digital signal to generate the frequency-shift signal. The oscillator generates substantially one cycle of the high-frequency signal to correspond to a bit of the input digital signal at the one logic state, and substantially one-half cycle of the low-frequency signal corresponding to the bit of the input digital signal at the other logic state.

The demodulator means has squaring means for producing a substantially square wave in response to the frequency-shift keyed signal with transitions substantially corresponding to the zero-crossings of the frequency-shift keyed signal; a first differentiator for differentiating high-to-low transitions of the square wave and generating a first transition signal; a second differentiator for differentiating low-to-high transitions of the square wave and generating a second transition signal; frequency detector means for measuring the time interval between successive signals of the first and second transition signals, and comparing the measured interval to a predetermined time constant to determine if the measured interval corresponds to the high-frequency or low-frequency signal, with the frequency detector means generating a frequency indicator signal; and a flip-flop having a data input receiving the frequency indicator signal and a clock input receiving the first and second transition signals for generating an output digital signal corresponding to the digital signal.

Other features and advantages of the invention will become apparent from the following more detailed description, taken in conjunction with the accompanying drawings.

BEST MODE FOR CARRYING OUT THE INVENTION

As shown in the drawings for purposes of illustration, the present invention is embodied in a data communication system, indicated generally by reference numeral 10, which includes a modulator 12 and a demodulator 14. The data communication system 10 of the invention is well suited for use in conjunction with digital data transmissions over telephone lines, and FM and AM radio and cable broadcasts having limited available bandwidth or as a means for increasing the rate of data transmission possible while utilizing a given bandwidth.

Figure 1:
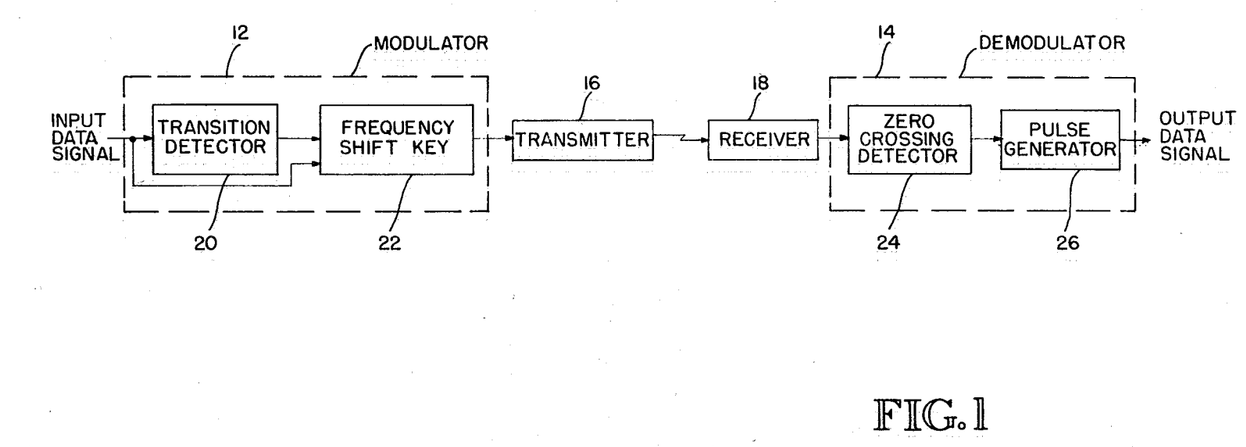
FIG. 1 is a functional block diagram of a data communications system embodying the present invention.

The data transmission system 10, illustrated in functional block diagram form in FIG. 1, is shown with the modulator 12 connected to a radio frequency (RF) transmitter 16 and the demodulator 14 connected to an RF receiver 18. The modulator 12 includes a transition detector 20 for detecting transitions in the logic state of an input data signal representing a serial data bit stream, and a frequency-shift key 22 for generating a frequency-shift keyed signal corresponding to the logic states of the input data signal. The frequency-shift keyed signal is supplied to the RF transmitter 16 for FM or AM modulation on a radio frequency carrier signal for transmission over the airways. The RF receiver 18 receives and demodulates the radio frequency carrier signal, and supplies the frequency-shift keyed signal to the demodulator 14.

The demodulator 14 includes a zero-crossing detector 24 for detecting zero-crossings of the frequency-shift keyed signal, and a pulse generator 26 for generating an output data signal representing a serial data bit stream corresponding to the input data signal to the modulator 12.

More specifically, the modulator 12 receives the input data signal and generates a corresponding frequency-shift keyed signal comprised of high-frequency and low-frequency signals with in-phase signal transitions at the frequency shifts. This is accomplished by the transition detector 20 generating a transition indicator signal indicating transitions in the logic state of the input data signal. The frequency-shift key 22 is responsive to the transition indicator signal and produces the frequency-shift keyed signal which changes without any substantial phase shift from one of the high-frequency or low-frequency signals to the other as the logic state of the input data signal changes.

The frequency-shift keyed signal generated by the frequency-shift key 22 has a data bit at one logic state of the input data signal being represented by one cycle of the high-frequency signal and a data bit at the other logic state of the input data signal being represented by one-half cycle of the low-frequency signal. In such fashion, the modulator 12 can transmit digital data using frequency-shift keying at a data transmission rate of approximately twice the rate of prior art modems, which require the transmission of at least one complete cycle of the lowest frequency signal to indicate a data bit of one logic state of an input data signal, without increasing the bandwidth required for the transmission. Alternatively, the data communication system of the present invention could be operated at the same data transmission rate as prior art modems, but with a required bandwidth of approximately one-half that required of the prior art.

The demodulator 14 receives the frequency-shift keyed signal communicated over the limited bandwidth transmission link and generates an output data signal using the zero-crossing detector 24 for detecting zero-crossings of the high-frequency and low-frequency signals comprising the frequency-shift keyed signal. The zero-crossing detector 24 generates a zero-crossing indicator signal indicating each zero-crossing. As used herein, a "zero-crossing" is at zero volts, or at any biased voltage level where the frequencyshift keyed signal is lower than a preselected level. The zero-crossings are described herein for a sinusoidal wave as being at the 0°, 180° and 360° points. The pulse generator 26 is responsive to the zero-crossing indicator signal and determines when a zero-crossing corresponds to a change from one to the other of the high-frequency and low-frequency signals, and in response thereto, generates the output data signal. Other zero-crossings of the high-frequency and low-frequency signals are ignored by the pulse generator 26.

The circuitry of the modulator 12 and demodulator 14 of the presently preferred embodiment of the invention will be now be described in detail using a telephone line as the bandwidth limited transmission means. The operation of the modulator 12 and demodulator 14 will be explained with reference to the timing diagrams of FIG. 4.

Figure 2:
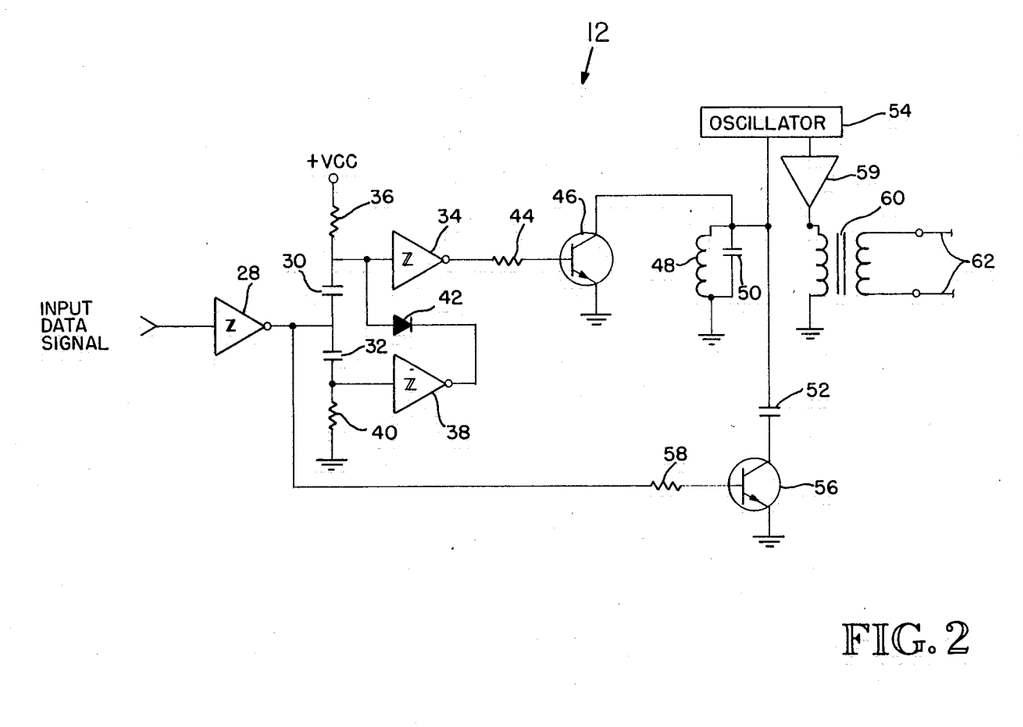
FIG. 2 is a schematic diagram showing the modulator circuit of the data communications system of FIG. 1.

The modulator 12, as illustrated schematically in FIG. 2, receives the input data signal in digital form on the input to a conventional inverting Schmitt trigger 28 which ensures the data signal has sharp transients during processing by the modulator. For purposes of illustration, the input data signal applied to the input of the Schmitt trigger 28 will be assumed to be the American National Standard Code for Information Interchange (ASCII) numeric character "5" comprising the seven binary digits 1010110. As in practice, the message would begin at a logic level "0" for however many bits since the prior input data signal and the current input data signal would commence with a START bit, which is a logic level "0" to "1" transition. A bit at logic level "0" follows the START bit, and thereafter follows the seven-bit code for an alphanumeric character, in the example herein, the ASCII code for the numeric character "5" (see first waveform of FIG. 4). Following the seven-bit code is a logic level "0" STOP bit, after which the data signal remains at logic level "0" until the next START bit preceding another seven-bit code.

The output of the Schmitt trigger 28 (see second waveform of FIG. 4) is connected to one plate of each of two differentiating capacitors 30 and 32. The opposite plate of the capacitor 30 is connected to the input of an inverting Schmitt trigger 34, which input is normally held high through a resistor 36 connected to a positive power supply voltage VCC. In a similar manner, the opposite plate of the capacitor 32 is connected to the input of another inverting Schmitt trigger 38, which input is normally held low through a resistor 40 connected to ground. A low-to-high transition of the output signal from the Schmitt trigger 28 is differentiated by the capacitor 32 and the resistor 40 to generate a positive-going spike on the input to the Schmitt trigger 38, as illustrated in the fourth waveform of FIG. 4. These spikes produce a pulse train of negative-going pulses on the output of the Schmitt trigger 38 (see fifth waveform of FIG. 4). These negative-going pulses are applied through a diode 42 to the input of the Schmitt trigger 34. The diode 42 is connected by its anode to the input of the Schmitt trigger 34 and by its cathode to the output of the Schmitt trigger 38.

Figure 4:
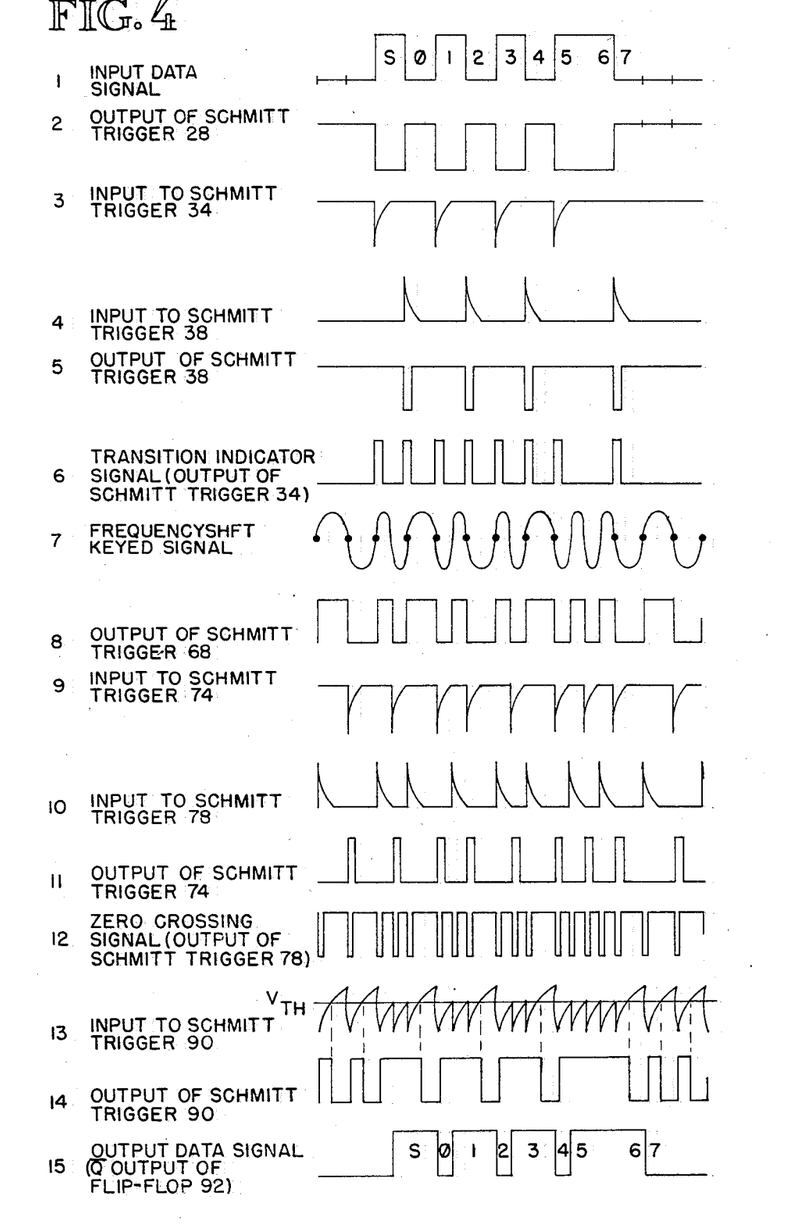
FIG. 4 is a timing diagram showing the signals at various points in the modulator and demodulator circuitry of FIGS. 2 and 3.

A high-to-low transition of the output of the Schmitt trigger 28 is differentiated by the capacitor 30 and the resistor 36 to generate a negative-going spike on the input to the Schmitt trigger 34, as illustrated in the third waveform of FIG. 4. These spikes produce a pulse train of positive-going pulses on the output of the Schmitt trigger 34. Positive-going pulses on the output of the Schmitt trigger 34 are also produced as a result of the negativegoing pulses applied to the input of the Schmitt trigger 34 through the diode 42 by the Schmitt trigger 38. Thus, a positive-going pulse is produced at the output of the Schmitt trigger 34 on both a high-to-low and a low-to-high transition of the Schmitt trigger 28 (which is merely the inversion of the data input signal), and provides the previously discussed transition indicator signal which indicates transitions in the logic state of the input data signal. The transition indicator signal is shown in the sixth waveform of FIG. 4 for the ASCII numeric character "5" being used as an example.

The output of the Schmitt trigger 34 is connected through a resistor 44 to the base of an NPN transistor 46. The emitter of the transistor 46 is connected to ground, and the collector is connected to a tank circuit comprising an inductor 48, a first capacitor 50, a second capacitor 52, and an oscillator 54 connected in parallel. The one terminal of the inductor 48, the oscillator 54 and the one plate of each of the capacitors 50 and 52 are connected to the collector of the transistor 46. The opposite terminal of the inductor 48 and the other plate of the capacitor 50 are connected to ground. The opposite plate of the capacitor 52 is connected to the collector of another NPN transistor 56, which, as will be described below, switches the capacitor 52 in and out of the tank circuit to change the frequency generated by the oscillator 54. The oscillator 54 in one embodiment is an audio oscillator, and produces a sinusoidal waveform with a high or low frequency, depending on the state of the tank circuit.

Each positive-going pulse produced by the Schmitt trigger 34 causes the transistor 46 to conduct and to reset the output of the oscillator 54 to zero. Thus, each transition in the logic state of the input data signal will correspond to an initial zero-crossing point for the sinusoidal waveform output of the oscillator 54 and produce synchronized zero-crossings with the transitions of the input data signal.

The output of the Schmitt trigger 28 is connected through a resistor 58 to the base of the transistor 56, and the emitter of the transistor is connected to ground. As a result, a logic level "1" on the input data signal will produce a ground on the output of the Schmitt trigger 28 which holds the transistor 56 off and effectively removes the capacitor 52 from the tank circuit. When the input data signal is at a logic level "0", a high voltage signal is on the output of the Schmitt trigger 28, which causes the transistor 56 to conduct and place the capacitor 52 in the tank circuit. Since the frequency of the oscillator 54 is dependent upon the amount of inductance and capacitance connected thereto, when the input data signal is at the logic level "0", the combined capacitance of the capacitors 50 and 52 causes the oscillator to produce a low-frequency sinusoidal waveform, and when the input data signal is at the logic level "1", only the capacitor 50 is connected and causes the output of the oscillator to produce a highfrequency sinusoidal waveform.

As illustrated by the seventh waveform of FIG. 4, the values for the inductor 48 and the capacitors 50 and 52 are chosen to produce a high-frequency signal with a frequency in Hertz substantially equal to the data rate of the input data signal in baud, and to produce a low-frequency signal which is approximately one-half the frequency of the data rate of the input data signal. Consequently, a bit at logic level "0" on the input data signal will cause the oscillator 54 to produce a half-cycle output of the low-frequency signal with two zero-crossings, and a bit at logic level "1" on the input data signal will cause the oscillator to produce a full-cycle output of the high-frequency signal with three zero-crossings. Furthermore, the transitions between the high-frequency and low-frequency signals are synchronized to occur with the transitions in the logic state of the input data signal, and always occur at the zero-crossing point for a smooth in-phase signal transition. The resulting signal is the previously discussed frequency-shift keyed signal and is shown in the seventh waveform of FIG. 4. The output of the oscillator 54 is connected through a buffer amplifier 59 to one of the input terminals of an audio transformer 60 and the other input terminal is connected to ground, and the outputs of the transformer are connected to a telephone line 62 for transmission of the frequency-shift keyed signal over the line. It is to be understood that the invention may be practiced using the low-frequency signal to represent the logic line "1" and the high-frequency signal to represent the logic level "0."

Figure 5:
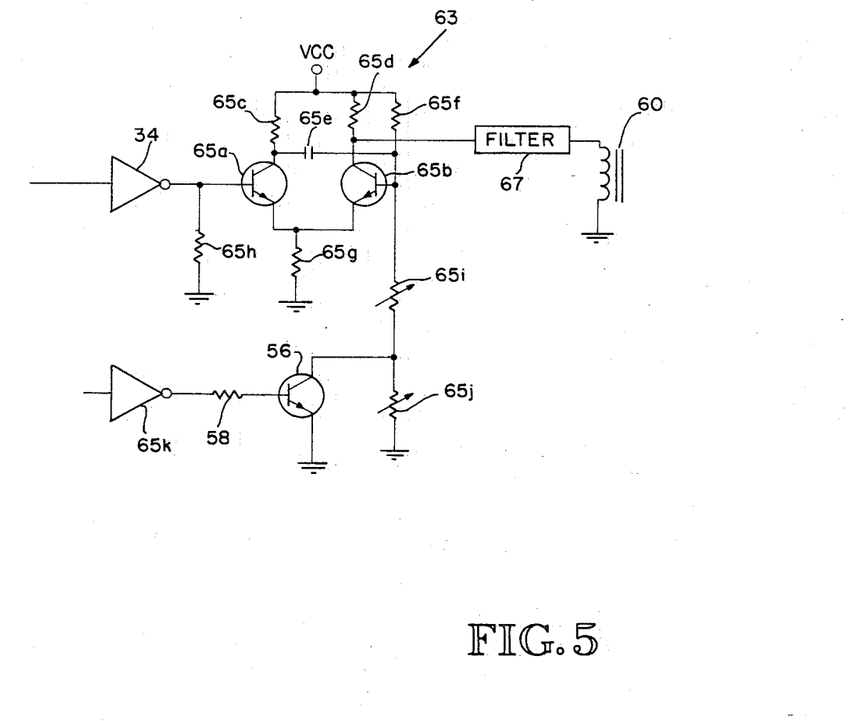
FIG. 5 is a schematic diagram showing an alternative embodiment of an oscillator used in the modulator of FIG. 2.

An alternative embodiment for the oscillator 54 is shown in FIG. 5 and comprises a free-running multivibrator 63. The multivibrator 63 includes a pair of NPN transistors 65a and 65b with their respective collectors connected to the power supply voltage VCC through a pair of resistors 65c and 65d. A capacitor 65e connects the collector of the transistor 65a to the base of the transistor 65b. The base of the transistor 65b is also connected to the power supply VCC through a resistor 65f. The emitters of the transistors 65a and 65b are tied together and connected to ground through a resistor 65b. The base of the transistor 65a is connected to ground through a resistor 65h. The multivibrator 63 produces a square wave on the collector of the transistor 65. The square wave is reset in response to each transition of the logic state of the input data signal by the connection of the base of the transistor 65a to the output of the Schmitt trigger 34 to ensure the multivibrator operates in synchronism with the input data signal. The multivibrator 63 is of a conventional emitter-coupled design.

The base of the transistor 65b is connected to ground through a serially connected pair of potentiometers 65i and 65j. The collector of the transistor 56 is connected to the junction of the potentiometers. With this embodiment of the oscillator 54, the output of the Schmitt trigger 28 is connected to the base drive resistor 58 of the transistor 56 through an inverter 65k. Much as previously described, the period or frequency of the square wave output of the multivibrator 63 is controlled by the transistor 56 turning off and on, depending on the logic state of the input data signal, and switching the potentiometer 65j in and out of the circuit. When transistor 56 is off, the time constant which establishes the high-frequency signal is determined by the product of the capacitance value of the capacitor 65e and the summed resistance value of the potentiometers 65i and 65j. When the transistor 56 conducts, the potentiometer 65j is shorted out by the transistor 56, and the time constant which establishes the low-frequency signal is determined by the product of the capacitance value of the capacitor 65e and the resistance value of the potentiometer 65i. The use of potentiometers allows fine adjustment of the two frequencies generated by the multivibrator.

The collector of the transistor 65b having the square wave output signal of the multivibrator 63 is connected to a filter 67 which filters out all but the fundamental frequency component of the square wave and produces a substantially sinusoidal output corresponding to the high-frequency and low-frequency signals previously discussed comprising the frequency shift-keyed signal. The output of the filter 67 is connected to the transformer 60.

While the signal resulting from the use of the multivibrator 63 and the filter 67 is generally sinusoidal in shape, it has been found that the signal's waveform in the area of its zero-crossings is more vertical than a true sinusoidal signal. This is because the second harmonic is present for the low-frequency signal since the filter 67 must, by necessity, have a cutoff frequency approximately equal to or greater than the high-frequency signal. Thus, the shifts between the high-frequency and low-frequency signals of the frequency shift-keyed signal, which occur approximately at the zero-crossings, are smoother than with true sinusoidal signals.

Figure 3:
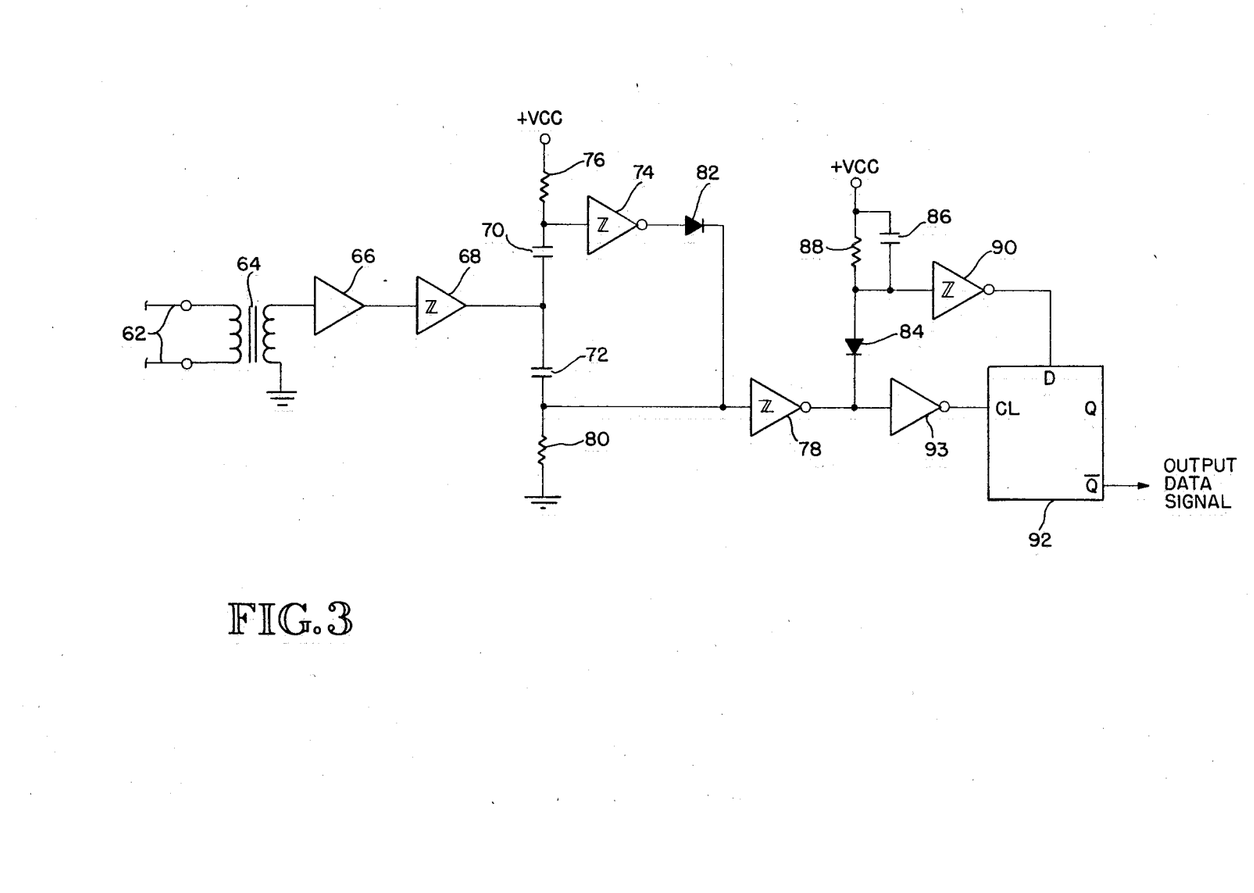
FIG. 3 is a schematic diagram showing the demodulator circuitry of the data communications system of FIG. 1.

The demodulator 14, as illustrated schematically in FIG. 3, receives the frequency-shift keyed signal at a remote location by connection of the input terminals of an audio transformer 64 to the telephone line 62. The one output terminal of the transformer 64 is connected to the input of a conventional high-gain squaring amplifier 66, which generates a square wave that is in phase with the frequency-shift keyed signal received. The other output terminal of the transformer 64 is connected to ground. The output of amplifier 66 is connected to the input of a non-inverting Schmitt trigger 68, which sharpens up the waveform transitions of the square wave produced by the amplifier 66 (see eighth waveform of FIG. 4).

The output of the Schmitt trigger 68 is connected to one plate of each of two differentiating capacitors 70 and 72. The opposite plate of the capacitor 70 is connected to the input of an inverting Schmitt trigger 74, which input is normally held high through a resistor 76 connected to a positive power supply voltage VCC. In a similar manner, the opposite plate of the capacitor 72 is connected to the input of another inverting Schmitt trigger 78, which input is normally held low through a resistor 80 connected to ground. A high-to-low transition of the output signal from the Schmitt trigger 68 is differentiated by the capacitor 70 and the resistor 76 to generate a negative-going spike on the input to the Schmitt trigger 74, as illustrated in the ninth waveform of FIG. 4. These spikes produce a pulse train of positive-going pulses on the output of the Schmitt trigger 74 (see eleventh waveform of FIG. 4). These positive-going pulses are applied through a diode 82 to the input of the Schmitt trigger 78. The diode 82 is connected by its anode to the output of the Schmitt trigger 74 and by its cathode to the input of the Schmitt trigger 78.

A low-to-high transition of the output of the Schmitt trigger 68 is differentiated by the capacitor 72 and the resistor 80 to generate a positive-going spike on the input of the Schmitt trigger 78, as illustrated in the tenth waveform of FIG. 4. These spikes produce a pulse train of negative-going pulses on the output of the Schmitt trigger 78. Negative-going pulses on the output of the Schmitt trigger 78 are also produced as a result of the positive-going pulses applied to the input of the Schmitt trigger 78 through the diode 82 by the Schmitt trigger 74. Thus, a negative-going pulse is produced at the output of the Schmitt trigger 78 on both a low-to-high and a high-to-low transition of the square wave on the output of the Schmitt trigger 68 (which corresponds to the frequency-shift keyed signal), and provides the previously discussed zero-crossing indicator signal which indicated each zero-crossing of the frequency-shift keyed signal. The zero-crossing signal is shown in the twelfth waveform of FIG. 4.

The output of the Schmitt trigger 78 is connected to the cathode of a diode 84 which has its anode connected to a capacitor 86. The remote plate of the capacitor 86 is connected to the positive power supply voltage VCC. The capacitor 86 is connected in parallel with a resistor 88. Each negative-going pulse at the output of the Schmitt trigger 78 charges the capacitor 86 through the diode 84. After being charged, the capacitor 86 thereafter begins discharging through the resistor 88 (see thirteenth waveform of FIG. 4). The input to an inverting Schmitt trigger 90 is connected to the junction point of the capacitor 86, the resistor 88, and the anode of the diode 84. Thus, the input to the Schmitt trigger 90 drops to zero during the almost instantaneous charge of the capacitor 86 by the negative-going pulse from the output of the Schmitt trigger 78, and then begins to rise in an exponential growth towards the positive power supply voltage VCC as the capacitor 84 discharges toward the supply voltage VCC.

The time constant of the discharge is determined by the resistor 88 and the capacitor 86, which values are selected so that the capacitor 86 does not discharge to the high threshold voltage level $V_{TH}$ of the Schmitt trigger 90 during the time interval occurring between negative-going pulses at the output of the Schmitt trigger 78 corresponding to the zero-crossings of the high-frequency signal of the frequency-shift keyed signal (i.e., representing a bit of the input data signal at the logic level "1"). The values of the resistor 88 and the capacitor 86 are selected, however, so that the substantially longer interval between the negative-going pulses corresponding to the zerocrossings of the lower frequency signal of the frequencyshift keyed signal (i.e., representing a bit of the input data signal at the logic level "0") is sufficient to allow the capacitor 86 to discharge to a voltage level rising above the high threshold voltage level $V_{TH}$ of the Schmitt trigger 90. As a result, the output of the Schmitt trigger 90 remains high as long as a high-frequency signal is received by the demodulator 14 (see fourteenth waveform of FIG. 4). However, when a low-frequency signal is received, the capacitor 86 discharges sufficiently to raise the input voltage on the Schmitt trigger 90 above the high threshold voltage level $V_{TH}$, causing the output of the Schmitt trigger to go low.

The output of the Schmitt trigger 90 (waveform fourteen of FIG. 4) is applied to the data input of a flip-flop 92, and the zero-crossing signal at the output of the Schmitt trigger 78 (waveform twelve of FIG. 4) is applied through an inverter 93 to the clock input of the flip-flop 92. The leading edge of the positive-going pulses of the inverted zero-crossing signal clocks a logic level "0" into the flip-flop 92 if the output of the Schmitt trigger 90 is low at the time of the clock pulse, and the leading edge of the negative-going pulse of the zerocrossing signal clocks a logic level "1" into the flip-flop 92 if the output of the Schmitt trigger 90 is high at the time of the clock pulse. The resulting inverted output signal on the flip-flop 92, illustrated in the fifteenth waveform of FIG. 4, is the data output signal, and consists of a serial data bit stream corresponding to the serial data bit stream of the input data signal originally applied to the modulator 12. Consequently, the output data signal is generated using only one-half of a cycle of the low-frequency signal to represent a logic level "0" rather than a full cycle, and as a result, the data may be transmitted at approximately twice the data transmission rate as when a full cycle is required, without increasing the bandwidth required for the transmission.

From the foregoing, it will be appreciated that the present invention provides a data communication system able to transmit digital data using a frequency-shift keying technique with increased transmission rates over a bandwidth limited link and to increase transmission rates of conventional communication systems without requiring use of additional bandwidth. It will also be appreciated that, although a specific embodiment of the invention has been described herein for purposes of illustration, various modifications may be made without departing from the spirit and scope of the invention. Accordingly, the invention is not to be limited except as by the appended claims.

I claim:

1. A system for communicating digital data over a transmission link comprising:
    transition detector means for detecting high-to-low transitions in the binary logic state of an input digital signal and generating a first transition indicator signal in response thereto, and for detecting low-to-high transitions in the binary logic state of said input digital signal and generating a second transition indicator signal in response thereto;
    oscillator means for selective generation of an output signal comprising a high-frequency signal at a frequency substantially equal to the baud rate of said input digital signal and a low-frequency signal at a frequency substantially equal to one-half the baud rate of said input digital signal;
    reset means for resetting said oscillator means to reset said oscillator output signal to a null position in response to each of said first and second transition indicator signals and allowing substantially in-phase switching of said oscillator output signal between said high-frequency and low-frequency signals;
    switching means for switching said oscillator means between said high-frequency and low-frequency signals in response to said input digital signal, said switching means switching said oscillator means to said high-frequency signal when said input digital signal is at one logic state for producing substantially one cycle of said high-frequency signal corresponding to a bit of said input digital signal at the one logic state, and switching said oscillator means to said low-frequency signal when said input digital signal is at an other logic state for producing substantially one-half cycle of said low-frequency signal corresponding to a bit of said input digital signal at the other logic state to generate a frequency-shift keyed signal to be transmitted over the link;
    zero-crossing detector means for detecting zero-crossings of said frequency-shift keyed signal received over the link and generating a zero-crossing indicator signal;
    frequency detector means responsive to said zero-crossing signal for detecting said high-frequency and low-frequency signals of said frequency-shift keyed signal, and generating a frequency indicator signal; and
    pulse generator means responsive to said zero-crossing indicator signal and said frequency indicator signal for generating an output digital signal corresponding to said input digital signal.

2. The system of claim 1 wherein said frequency detector means detects said high-frequency and low-frequency signals by measuring the time interval between successive signals of said zero-crossing signal against a predetermined time constant to determine if the measured time interval between zero-crossings corresponds to said high-frequency or low-frequency signal.

3. A modulator for receiving an input digital signal and generating a corresponding frequency-shift keyed signal, comprising:
    a first differentiator for differentiating high-to-low transitions of said input digital signal and generating a first transition signal;
    a second differentiator for differentiating low-to-high transitions of said input digital signal and generating a second transition signal; an oscillator for selective generation of an output signal comprising a high-frequency signal and a low-frequency signal;
    a reset for resetting said oscillator output signal to a null position in response to each of said first and second transition signals, and providing substantially in-phase switching of said oscillator output signal between said high-frequency and low-frequency signals; and a switch for switching said oscillator between said high-frequency and low-frequency signals in response to said input digital signal, said switch switching said oscillator to said high-frequency signal when said input digital signal is at one logic state and switching said oscillator to said low-frequency signal when said input digital signal is at another logic state to generate the frequency-shift keyed signal.

4. A system for communicating digital data over a transmission link, comprising:

a first differentiator for differentiating high-to-low transitions of an input digital signal and generating a first transition signal;

a second differentiator for differentiating low-to-high transitions of said input digital signal and generating a second transition signal;

an oscillator for selective generation of an output signal comprising a high-frequency signal and a low-frequency signal;

a reset for resetting said oscillator output signal to a null position in response to each of said first and second transition signals, and providing substantially in-phase switching of said oscillator output signal between said high-frequency and low-frequency signals;

a switch for switching said oscillator between said high-frequency and low-frequency signals in response to said input digital signal, said switch switching said oscillator to said high-frequency signal when said input digital signal is at one logic state and switching said oscillator to said low-frequency signal when said input digital signal is at another logic state to generate a frequency-shift keyed signal to be transmitted over the link;

squaring means for producing a substantially square wave in response to said frequency-shift keyed signal with transitions substantially corresponding to the zero-crossing of said frequency-shift keyed signal;

a first differentiator for differentiating high-to-low transitions of said square wave and generating a first transition signal;

a second differentiator for differentiating low-to-high transitions of said square wave and generating a second transition signal;

frequency detector means for measuring the time interval between successive signals of said first and second transition signals, and comparing said measured interval to a predetermined time constant to determine if said measured interval corresponds to said high-frequency or low-frequency signal, said frequency detector means generating a frequency indicator signal; and a flip-flop having a data input receiving said frequency indicator signal and a clock input receiving said first and second transition signals for generating an output digital signal corresponding to said input digital signal.

5. A system for communicating digital data over a transmission link, comprising:

a transition detector for detecting high-to-low transitions in the binary logic state of an input digital signal and generating a first transition indicator signal in response thereto, and for detecting low-to-high transitions in the binary logic state of said input digital signal and generating a second transition indicator signal in response thereto;

an oscillator for selective generation of an output signal comprising a high-frequency signal at a frequency substantially equal to the baud rate of said input digital signal and a low frequency signal at a frequency substantially equal to one-half the baud rate of said input digital signal;

a reset for resetting said oscillator output signal to a null position in response to each of said first and second transition indicator signals and providing substantially in-phase switching of said oscillator output signal between said high-frequency and low-frequency signals;

a switch for switching said oscillator between said high-frequency and low-frequency signals in response to said input digital signal, said switch switching said oscillator to said high-frequency signal when said input digital signal is at one logic state for producing substantially one cycle of said high-frequency signal corresponding to a bit of said input digital signal at the one logic state, and switching said oscillator means to said low-frequency signal when said input digital signal is at another logic state for producing substantially one-half cycle of said low-frequency signal corresponding to a bit of said input digital signal at the other logic state to generate a frequency-shift keyed signal to be transmitted over the link;

a zero-crossing detector for detecting zero-crossings of said frequency-shift keyed signal received over the link and generating a zero-crossing indicator signal;

a frequency detector responsive to said zero-crossing signal for detecting said high-frequency and low-frequency signals of said frequency-shift keyed signal, and generating a frequency indicator signal; and a pulse generator responsive to said zero-crossing indicator signal and said frequency indicator signal for generating an output digital signal corresponding to said input digital signal.

6. A method for communicating digital data over a transmission link, comprising:

detecting high-to-low transitions in the binary logic state of an input digital signal and generating a first transition indicator signal in response thereto;

detecting low-to-high transitions in the binary logic state of said input digital signal and generating a second transition indicator signal in response thereto;

selectively generating an output signal comprising a high-frequency signal at a frequency substantially equal to the baud rate of said input digital signal and a low-frequency signal at a frequency substantially equal to one-half the baud rate of said input digital signal;

resetting said output signal to a null position in response to each of said first and second transition signals and providing substantially in-phase switching of said output signal between said high-frequency and low-frequency signals;

switching said output signal between said high-frequency and low-frequency signals in response to said input digital signal, said switching of said output signal to said high-frequency signal occurring when said input digital signal is at one logic state to produce substantially one cycle of said high-frequency signal corresponding to a bit of said input digital signal at the one logic state; and switching said output signal to said low frequency signal occurring when said input digital signal is at an other logic state to provide substantially one-half cycle of said low-frequency signal corresponding to a bit of said input digital signal at the other logic state, thereby generating a frequency shift-keyed signal;

detecting zero-crossings of said frequency-shift keyed signal received over the link and generating a zero-crossing indicator signal;

detecting said high-frequency and low-frequency signals of said frequency-shift keyed signal from said zero-crossing signal, and generating a frequency indicator signal; and generating an output digital signal corresponding to said input digital signal from said zero-crossing indicator signal and said frequency indicator signal.

7. The method of claim 6 wherein said high-frequency and low-frequency signals are detected by measuring the time interval between successive signals of said zero-crossing signal against a predetermined time constant to determine if the measured time interval between zero-crossings corresponds to said high-frequency or low-frequency signal.

8. The system of claim 1 wherein said output signal of said oscillator means is dependent on the connection of an external resistive or capacitive element thereto, and said switching means switches said element into and out of connection with said oscillator means in response to the logic state of said input digital signal.

* * * * *